(12) United States Patent
Urbanec et al.

(10) Patent No.: US 12,091,189 B2
(45) Date of Patent: Sep. 17, 2024

(54) SYSTEMS AND METHODS FOR ENABLING USER CONTROL OVER USE OF AIRCRAFT SENSORS LOCATED ONBOARD AN AIRCRAFT

(71) Applicant: HONEYWELL INTERNATIONAL INC., Charlotte, NC (US)

(72) Inventors: Jan Urbanec, Brno (CZ); Abhishek Kumar Mishra, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 267 days.

(21) Appl. No.: 17/651,530

(22) Filed: Feb. 17, 2022

(65) Prior Publication Data

US 2023/0211894 A1  Jul. 6, 2023

(30) Foreign Application Priority Data

Jan. 5, 2022 (IN) .............................. 202211000568

(51) Int. Cl.
*B64D 45/00* (2006.01)
*G01C 23/00* (2006.01)
(Continued)

(52) U.S. Cl.
CPC ............ *B64D 45/00* (2013.01); *G01C 23/00* (2013.01); *G06F 3/0482* (2013.01); *G06F 3/0488* (2013.01)

(58) Field of Classification Search
CPC ............ B64D 45/00; B64D 2045/0075; G01C 23/00; G06F 3/0482; G06F 3/0488
See application file for complete search history.

(56) References Cited

U.S. PATENT DOCUMENTS 6,115,654 A    9/2000  Eid et al.
6,753,891 B1   6/2004  Chohan et al.
(Continued)

FOREIGN PATENT DOCUMENTS

DE  102008019104 A1   5/2009
EP     0913746 A2    5/1999
EP     3578458 A1   12/2019

OTHER PUBLICATIONS

"Sensors Grouping Hierarchy Structure for Wireless Sensor Network" by A. Hawbani et al., International Journal of Distributed Sensor Networks, vol. 2015, Article ID 650519 (Year: 2015).*

*Primary Examiner* — Peter D Nolan
*Assistant Examiner* — Tanya C Sienko
(74) *Attorney, Agent, or Firm* — Lorenz & Kopf LLP

(57) ABSTRACT

Systems and methods enabling user control over use of aircraft sensors located onboard an aircraft. The method receives sensor signals comprising any combination of ADS signals, IRS signals and a third RA signals, and GPS signals; comparing sensor data values in the sensor signals to each other and to respective acceptable thresholds and critical thresholds that are preprogrammed; grouping avionic systems on-board the aircraft into subgroups having a same sensor reliance; presenting a graphical user interface (GUI) page on the display system, the GUI page identifying a sensor subgroup, the aircraft sensors of the respective sensor subgroup, and respective critical sensor parameters and associated critical sensor parameter data; visually distinguishing an critical sensor parameter data that exceeds the respective acceptable threshold or exceeds the respective critical threshold; and, accepting user deselections of aircraft sensors via the GUI page.

17 Claims, 6 Drawing Sheets

(51) Int. Cl.
*G06F 3/0482* (2013.01)
*G06F 3/0488* (2022.01)

(56) References Cited

U.S. PATENT DOCUMENTS

| | | | |
|---|---|---|---|
| 8,159,464 B1* | 4/2012 | Gribble | G06F 3/04886 |
| | | | 345/173 |
| 9,233,763 B1* | 1/2016 | Chen | G07C 5/0808 |
| 2014/0207314 A1* | 7/2014 | Kou | B64D 45/00 |
| | | | 701/14 |
| 2015/0054664 A1 | 2/2015 | Dupont De Dinechin | |
| 2015/0057960 A1 | 2/2015 | Dinechin | |
| 2020/0201312 A1 | 6/2020 | Whitehead et al. | |

* cited by examiner

SYSTEMS AND METHODS FOR ENABLING USER CONTROL OVER USE OF AIRCRAFT SENSORS LOCATED ONBOARD AN AIRCRAFT

CROSS-REFERENCE TO RELATED APPLICATION

This application claims priority to India Provisional Patent Application No. 202211000568, filed Jan. 5, 2022, the entire content of which is incorporated by reference herein.

TECHNICAL FIELD

The following disclosure generally relates to display systems for mobile platforms. More particularly, the following disclosure relates to systems and methods for enabling user control over use of aircraft sensors located onboard an aircraft.

BACKGROUND

As cockpit display systems become more complex, pilots are presented with so many different symbols, announcements, and alert announcements that it is highly cognitively demanding to address them all with appropriate priority. Responding to alert announcements can require a pilot to acknowledge a detected monitoring system that generated the alert announcement, understand the monitoring system architecture, locate cockpit control elements that are associated with the monitoring system, and resolve the alert.

In a non-limiting example, an alert announcement may indicate a performance issue, or a "miscompare", among one or more on-board aircraft sensors. One or more of the cockpit control elements that a pilot must use to resolve an aircraft sensor miscompare might be displayed on multiple displays and avionics systems menu pages that are physically distinct and scattered throughout the cockpit. Additionally, the control elements may include a combination of touch screens, displays, user input devices, and physical switches.

A technical problem is presented in that an appropriate response to the alert announcement is a function of a depth of pilot training and knowledge regarding how to deal with some of these failures and what the effect of these failures on respective avionics systems behavior is. Additionally, again dependent upon a pilot's training and knowledge, a pilot can sometimes wrongly identify a source of the alert announcement as erroneous, even though it was the good source.

Accordingly, improved flight display systems and methods that enable user control over use of aircraft sensors located onboard an aircraft are desired. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system enabling user control over use of aircraft sensors located onboard an aircraft. The system includes: a plurality of avionic systems onboard the aircraft; a display system; a plurality of aircraft sensors comprising a first number of air data system (ADS) sensors, a second number of inertial reference system (IRS) sensors, and a third number of radio altimeter sensors (RA), wherein each ADS sensor generates a respective ADS signal, each IRS sensor generates a respective IRS signal, and each RA sensor generates a respective RA signal, and a controller circuit in operable communication with the aircraft sensors and the plurality of avionic systems, and programmed to: receive the ADS signals, the IRS signals, and the RA signals, collectively referred to as sensor signals; determine, for each avionic system of the plurality of avionic systems, a respective sensor reliance, defined as a unique combination of aircraft sensors that the avionic system consumes sensor signals from; group the aircraft sensors into sensor subgroups by sensor type; present a graphical user interface (GUI) page on the display system, the GUI page identifying a sensor subgroup, the aircraft sensors of the respective sensor subgroup, and critical sensor parameter and associated critical sensor parameter data from each aircraft sensor in the sensor subgroup; visually distinguish on the GUI page, critical sensor parameter data that exceeds an acceptable threshold in comparison to a remainder of critical sensor parameter data; generate a representative ADS signal based on the ADS signals; generate a representative IRS signal based on the IRS signals; generate a representative RA signal based on the RA signals; and transmit the representative ADS signal, the representative IRS signal and the representative RA signal to each avionic system of the plurality of avionic systems, only in accordance with the sensor reliance for the respective avionic system.

Also provided is a method enabling user control over use of aircraft sensors located onboard an aircraft, comprising: at a controller circuit in operable communication with the aircraft sensors and a plurality of avionic systems, the aircraft sensors comprising a first number of air data system (ADS) sensors, a second number of inertial reference system (IRS) sensors, and a third number of radio altimeter sensors (RA): receiving a first number of ADS signals, a second number of IRS signals and a third number of RA signals, the ADS signals, the IRS signals, and the RA signals, collectively referred to as sensor signals; generating a representative ADS signal based on the ADS signals; generating a representative IRS signal based on the IRS signals; generating a representative RA signal based on the RA signals; determining, for each avionic system of a plurality of avionic systems on-board the aircraft, a respective sensor reliance, defined as a unique combination of aircraft sensors that the avionic system consumes sensor signals from; grouping the aircraft sensors into sensor subgroups by sensor type; presenting a graphical user interface (GUI) page on the display system, the GUI page identifying a sensor subgroup, the aircraft sensors of the respective sensor subgroup, and a critical sensor parameter and associated critical sensor parameter data from each aircraft sensor in the sensor subgroup; visually distinguishing on the GUI page, critical sensor parameter data that exceeds an acceptable threshold in comparison to a remainder of critical sensor parameter data; visually distinguishing on the GUI, critical sensor parameter data determined to be from a failed aircraft sensor; responding to a user selection on the GUI page of an aircraft sensor by preventing consumption of the critical sensor parameter data from the aircraft sensor of the user selection; transmitting the representative ADS signal, the representative IRS signal and the representative RA signal to each avionic system of the plurality of avionic systems, only in accordance with the sensor reliance for the respective avionic system.

Another embodiment of a method enabling user control over use of aircraft sensors located onboard an aircraft, the aircraft sensors comprising a first number of air data system (ADS) sensors, a second number of inertial reference system (IRS) sensors, and a third number of radio altimeter sensors (RA), is provided. The method includes: at a controller circuit in operable communications with the aircraft sensors and a plurality of avionic systems: receiving sensor signals comprising a first number of ADS signals, a second number of IRS signals and a third number of RA signals; comparing aircraft sensor data values in the sensor signals to each other and to respective acceptable thresholds and critical thresholds that are preprogrammed; determining, for each avionic system of a plurality of avionic systems on-board the aircraft, a respective sensor reliance, defined as a unique combination of aircraft sensors that the avionic system consumes sensor signals from; grouping the aircraft sensors into sensor subgroups by sensor type; presenting a graphical user interface (GUI) page on the display system, the GUI page identifying a sensor subgroup, the aircraft sensors of the respective sensor subgroup, and a critical sensor parameter and associated critical sensor parameter data from each aircraft sensor in the sensor subgroup; visually distinguishing on the GUI page, critical sensor parameter data that exceeds a respective acceptable threshold or exceeds the respective critical threshold; responding to a user selection of an aircraft sensor by preventing consumption of critical sensor parameter data from the aircraft sensor of the user selection; and transmitting a representative ADS signal, a representative IRS signal and a representative RA signal to each avionic system of the plurality of avionic systems, only in accordance with the sensor reliance for the respective avionic system.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Figure 2:
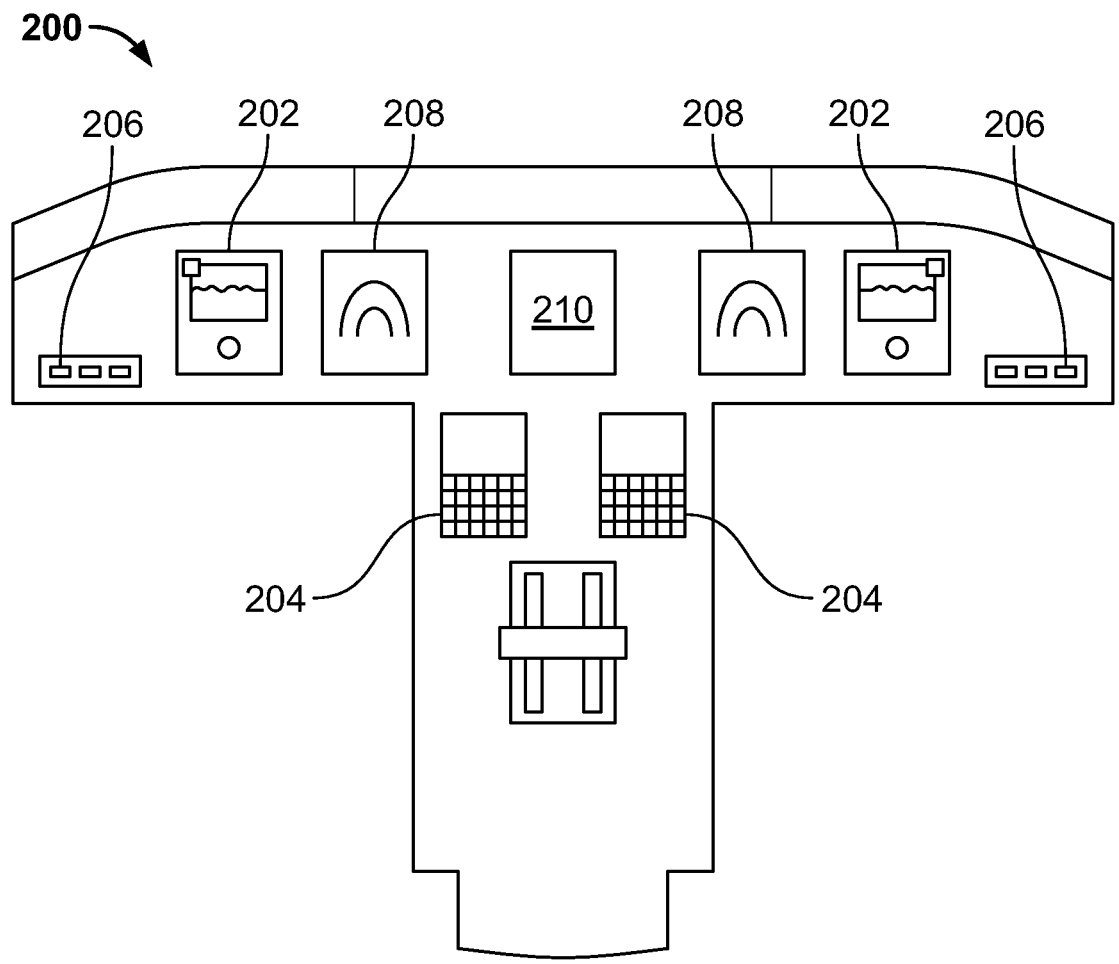
FIG. 2 is an illustration of a cockpit of an aircraft, showing general locations of various avionic displays, in accordance with exemplary embodiments of the present disclosure.

As mentioned, responding to alert announcements, such as alerts indicating a performance issue, or a "miscompare", among one or more on-board aircraft sensors, is cognitively demanding. One or more of the cockpit control elements that a pilot must use to resolve an aircraft sensor miscompare might be displayed on multiple displays and avionics systems menu pages that are physically distinct and scattered throughout the cockpit (see, e.g., FIG. 2). Additionally, the control elements may include a combination of touch screens, displays, user input devices, and physical switches (FIG. 2, 206).

Different avionics systems use sensor data in different ways. Available solutions require additional pilot training and rely on a pilot memorizing system architectures and respective control elements for each consuming avionic system. In various available solutions, a pilot must go to a user interface of each system, determine whether the system has determined that the sensor is faulty, and ensure that each system relying on the sensor that generated the sensor data stops using the sensor data it provides. This presents an enormous technical challenge because an appropriate response is a function of a depth of pilot training and knowledge regarding how to deal with some of these failures and what the effect of these failures on respective avionics systems behavior is. Additionally, again dependent upon a pilot's training and knowledge, a pilot can sometimes wrongly identify a source as erroneous, even though it was a good source.

An exemplary scenario, in which a failure of an inertial sensor provides erroneous sensor data, is described below (in other scenarios, other sensors may be the source of the alert):

A monitoring system detects a miscompare of sensor data in the form of an aircraft attitude indication between a pilot attitude indicator and copilot attitude indicator.

The monitoring system flags this miscompare and causes aircraft display system to annunciate a miscompare alert. In an embodiment, the miscompare alert is displayed next to respective questionable data—e.g., attitude data, on both pilot and copilot display (an example location for these miscompare alerts is shown in FIG. 2, 206).

The pilot recognizes the miscompare flag and resolves it by taking following steps:
1. Understand system architecture for system consuming particular sensor data.
2. Compare pilot, copilot, and standby display attitude with each other and makes educated judgement of which source of the sensor data is incorrect.
3. Use reversionary controls in the cockpit to switch to a different available inertial sensor, compare the sources to identify a problem sensor, and ensure that the problem sensor is not used by the display system.

In addition, the pilot must know that sensor data from the inertial sensor that is the problem sensor may be consumed by one or more other aircraft systems, e.g., such as, to contribute to computation of an aircraft position in a navigation computer. To assure that the problem sensor is not relied on by other avionic systems, the pilot may have to locate appropriate page on an avionics control unit, which might require some time to locate, especially because this task is not performed on a regular basis (an example location for these Navigation system control menu pages may be FIG. 2, 204). Once the appropriate Navigation system control menu page is displayed, the pilot may have to navigate to an appropriate sub-page where the problem sensor can be manually deselected.

Provided embodiments provide a technical solution to these technical challenges. Provided embodiments take the form of a controller circuit or control module programmed with sensor data integration techniques and malfunction algorithms, to automate, eliminate, or simplify (make more intuitive), or reduce many of the cumbersome steps described above. Provided embodiments generate/display a page that helps a pilot see and better identify a problem sensor by flagging miscomparing data.

Figure 1:
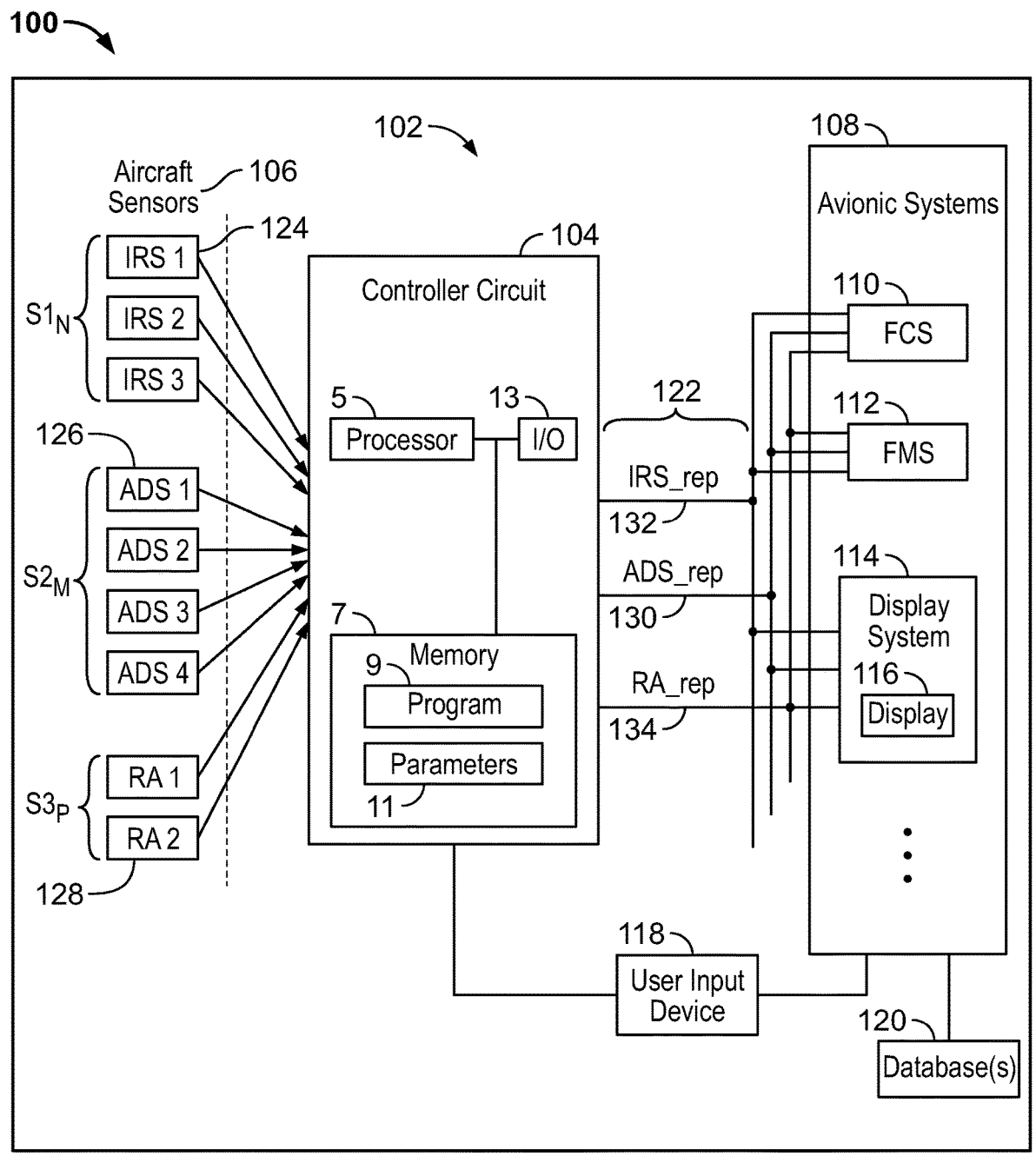
FIG. 1 shows a functional block diagram of an aircraft including a system for enabling user control over use of aircraft sensors located onboard an aircraft, in accordance with exemplary embodiments of the present disclosure.

FIG. 1 is a block diagram of a system for enabling user control over use of aircraft sensors located onboard an aircraft (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is an aircraft 100, which carries or is equipped with the system 102. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), or glider, for example. Aircraft 100 may be "manned" in the conventional sense that the flight crew is present within the aircraft 100, or it may be manned remotely.

In an embodiment schematically depicted in FIG. 1, system 102 tasks and functions are controlled by a controller circuit 104 in operational communication with various on-board aircraft sensors 106 and a plurality of on-board avionic systems 108, such that the controller circuit 104 can receive from each of the on-board aircraft sensors 106, a respective sensor signal, and generate representative sensor signals 122 based thereon. As may be appreciated, in practice, the tasks and functions attributed to controller circuit 104 may be integrated into one or more of the avionics systems 108. Non-limiting examples of the avionic systems 108 that are positioned to consume the representative sensor signals 122 include a flight control system (FCS) 110, a navigation computer or flight management system (FMS) 112, and a display system 114. By non-limiting, this implies that other avionic systems, not itemized here, may consume sensor data from the on-board aircraft sensors 106. A database 120 may provide data and information for various avionic systems 108.

The display system 114 generates one or more avionic displays 116, described in more detail below. The avionic display 116 and at least one user input device 118 are often integrated or coordinating with each other as part of a human machine interface (HMI). In various embodiments, the user input device 118 may be one or more of a keyboard, cursor control device, voice input device, gesture input apparatus, or the like. In various embodiments, an on-board HMI may include multiple display devices and/or multiple user input devices 118.

Each of the controller circuit 104, HMI, and avionic systems 108 may assume the form of a single device or multiple interconnected devices.

Generally, the aircraft sensors 106 include a variety of different sensor types. In an embodiment, aircraft sensors 106 may include a first number (N) of a first type of sensors (S1), a second number (M) of a second type of sensors (S2), a third number (P) of a third type of sensors (S3), and so on. As mentioned above, each S1 sensor generates a respective S1n signal, each S2 sensor generates a respective S2m signal, and each S3 sensor generates a respective S3p signal. In the non-limiting example shown in FIG. 1, S1 sensors are of the sensor type inertial reference system (IRS) sensors 124, S2 sensors are of the sensor type air data system (ADS) sensors 126, and S3 sensors are of the sensor type radio altimeter (RA) sensors 128. In various embodiments, aircraft sensors 106 include sensor type GPS sensors.

In the exemplary embodiment of FIG. 1, N equals three, M equals four, and P equals two, and the embodiment shown in FIG. 1 may be described as a first number of ADS sensors 126, a second number of IRS sensors 124, and a third number of RA sensors 128, and wherein each ADS sensor generates a respective ADSm signal, each IRS sensor generates a respective IRSn signal, and each RA sensor generates a respective RAp signal.

The sensor signals are inputs to the controller circuit 104, and each provides respective sensor data. The controller circuit 104 performs operations based at least in part on the received sensor signals. In various embodiments, the controller circuit 104 performs the operations of generating a representative sensor signal for each type of sensor. Accordingly, the controller circuit 104 generates a representative ADS signal 130 based on the ADSm signals; generates a representative IRS signal 132 based on the IRSn signals; and generates a representative RA signal 134 based on the RAp signals. The avionic systems 108 consume the sensor data embodied in the representative sensor signals 122.

In a first embodiment supported by FIG. 1, a user may view avionics pages and GUI pages via the HMI (user input device and display device 116), and the user may provide at least one user-provided sensor reliance that the system 102 will use to route the representative sensor signals 122 to the various avionic systems 108 is responsive to user input. In a second embodiment supported by FIG. 1, the controller circuit 104 determines all sensor reliances for the avionic systems 108, and routes the representative sensor signals 122, performing this routing without user direction, as is described in more detail below.

A sensor reliance is defined herein as a unique combination of aircraft sensors 106 and sensor types that the avionic system consumes sensor signals from. In some embodiments, a user is in control of this sensor reliance and inputs it into the system 102. In various embodiments, as is described in more detail below, the system 102 provides enhancements to existing avionic displays by determining a respective sensor reliance for each avionic system of the plurality of avionic systems 108.

In various embodiments, the system also provides an enhancement over existing systems by organizing the avionic systems 108 into avionic subgroups having in common the same sensor reliance.

Some of the technical problems associated with the available solutions described above are illustrated in FIG. 2, with continued reference to FIG. 1. Within the avionic systems, the display system 114 is configured to receive and process information from various on-board avionic systems 108, the representative sensor signals 122, and databases 120, perform display processing and graphics processing, and to drive the one or more display device(s) 116 to render features in one or more avionic displays in a cockpit 200 of an aircraft (e.g., any of displays 202, 204, 208, and 210), as is conventionally known. The term "avionic display" is defined as synonymous with the term "aircraft-related display" and "cockpit display" and encompasses displays generated in textual, graphical, cartographical, and other formats. In various embodiments, the avionic display is a primary flight display (PFD) or a navigation display. In various embodiments, the avionic display can be, or include any of various types of lateral displays and vertical situation displays on which map views and symbology, text announcements, and other graphics pertaining to flight planning are presented for a pilot to view.

As is described in more detail below, the avionic display, generated and controlled by the system 102, can include at least graphical user interface (GUI) objects and alphanumerical input/output displays of the type commonly presented on the screens of Multi-function Control and Display Units (MCDUs), as well as Control Display Units (CDUs) generally. In various embodiments, overlays or presentations are rendered on the avionic display, responsive to user requests via the HMI.

Accordingly, the display device 116 may be configured as a multi-function display (MFD) to include any number and type of image generating devices on which one or more avionic displays may be produced. The display device 116 may embody a touch screen display. When the system 102 is utilized for a manned aircraft, display device 116 may be affixed to the static structure of the Aircraft cockpit as, for example, the aforementioned Head Up Display (HUD) unit, or a Head Down Display (HDD). Alternatively, display device 116 may assume the form of a movable display device (e.g., a pilot-worn display device) or a portable display device, such as an Electronic Flight Bag (EFB), a laptop, or a tablet computer carried into the Aircraft cockpit by a pilot.

Via various display and graphics systems processes, the controller circuit 104 and display system 114 may command and control the generation of a variety of graphical user interface (GUI) objects or elements described herein for display on the display device 116, including, for example, tabs, buttons, sliders, and the like, which are used to prompt a user to interact with the human-machine interface to provide user input, and to activate respective functions and provide user feedback, responsive to received user input at the GUI object. In various embodiments, the system 102 is configured to continually generate and update one or more avionic displays, described herein.

The database 120 represents one or more onboard databases, each being a computer-readable storage media or memory. In various embodiments, onboard database 120 stores two- or three-dimensional map data, including airport features data (e.g., taxi routes and runways), geographical (terrain), buildings, bridges, and other structures, street maps, and may include a navigation database, NAVDB. In various embodiments, the data stored in the database 120 may be regulated and periodically updated, as directed by a regulating entity.

It should be appreciated that aircraft 100 includes many more additional features (systems, components, databases, etc.) than the illustrated systems 106-128. For purposes of simplicity of illustration and discussion, however, the illustrated aircraft 100 omits these additional features.

In some embodiments, the controller circuit 104 functionality may be integrated within a preexisting mobile platform management system, avionics system, cockpit display system (CDS), flight controls system (FCS), or aircraft flight management system (FMS). Although the controller circuit 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, the display system 114 and user input device 118 may be part of the EFB or PED.

The term "controller circuit," as appearing herein, broadly encompasses those components utilized to carry-out or otherwise support the processing functionalities of the system 102. Accordingly, in various embodiments, the controller circuit 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices (including or in addition to memory 7), power supplies, storage devices, interface cards, and other standardized components.

In various embodiments, as depicted in FIG. 1, the controller circuit 104 is realized as an enhanced computer system, having one or more processors 5 operationally coupled to computer-readable storage media or memory 7, having stored therein at least one novel firmware or software program 9 (generally, computer-readable instructions that embody an algorithm) for carrying-out the various process tasks, calculations, and control/display functions described herein. In various embodiments, predefined thresholds, and parameters 11 are also stored in memory 7. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the processor 5, and hence the controller circuit 104, may be programmed with and execute the at least one firmware or software program (for example, program 9, described in more detail below) that embodies an algorithm for receiving, processing, enabling, generating, updating, and rendering, described herein, to thereby perform the various process steps, tasks, calculations, and control/display functions described herein.

In various embodiments, the processor 5 includes or is operationally coupled to input/output circuitry 13 that includes the hardware and software to communicate with the aircraft sensors 106 and the avionic systems 108.

Figure 3:
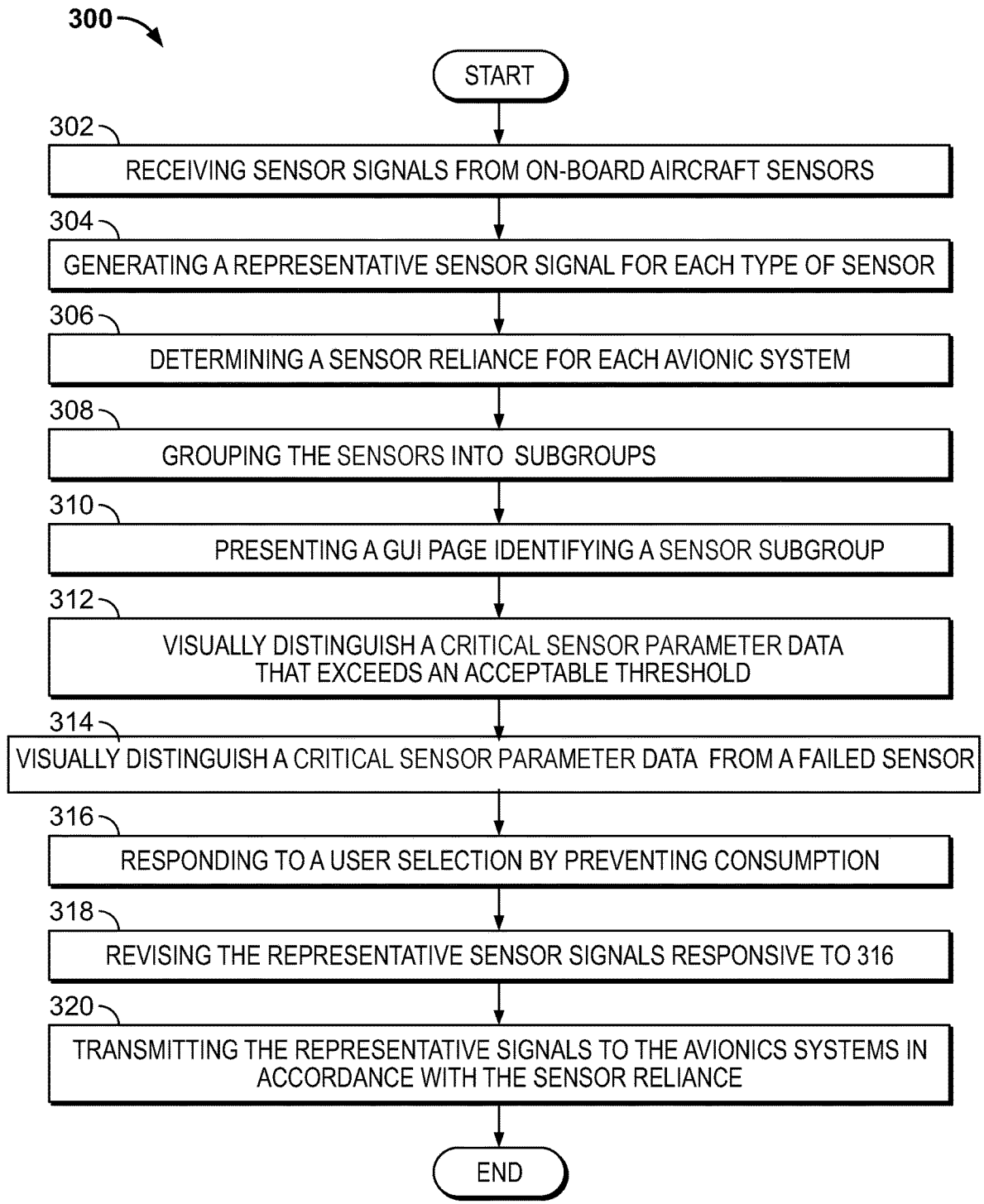
FIG. 3 is a flowchart illustrating a method for enabling user control over use of aircraft sensors located onboard an aircraft, in accordance with exemplary embodiments of the present disclosure.

Turning now to FIG. 3, and with continued reference to FIGS. 1-2, a flowchart of a method 300 for enabling user control over use of aircraft sensors located onboard an aircraft is provided, in accordance with exemplary embodiments of the present disclosure. For illustrative purposes, the following description of method 300 may refer to elements mentioned above in connection with FIG. 1, for example, the tasks/operations may be performed by the controller circuit 104. In practice, portions of method 300 may be performed by different components of the described system. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

At 302, at a controller circuit operationally positioned between aircraft sensors 106 and a plurality of avionic systems 108, receiving a first number of ADS signals, a second number of IRS signals and a third number of RA signals, the ADS signals, the IRS signals, and the RA signals, collectively referred to as sensor signals. As mentioned above, each sensor signal provides respective sensor data.

At 304, the method 300 generates a representative sensor signal for each type of aircraft sensor of the aircraft sensors 106. At 304, the method 300 may optionally compare sensor data in each sensor signal from a same type of aircraft sensor to a remainder of the sensor data from the sensor signals of the same type of aircraft sensor. A desired goal of the method 300 is for the sensor data from each aircraft sensor of the same type to be within a threshold of each other. In various embodiments, a miscompare is identified when sensor data exceeds a threshold from remaining sensor data in the same aircraft sensor type.

At 306, the method 300 determines, for each avionic system of a plurality of avionic systems on-board the aircraft, a respective sensor reliance, defined as a unique combination of aircraft sensors that the avionic system consumes sensor signals from. In an embodiment, the sensor reliance includes just one instance of one type of aircraft sensors 106: ADS sensors 126, IRS sensors 124, RA sensors 128, or GPS sensors; in an embodiment, the sensor reliance includes any two types of aircraft sensors 106: ADS sensors 126, IRS sensors 124, RA sensors, and GPS sensors; in an embodiment, the sensor reliance includes all types of aircraft sensors 106: ADS sensors 126, IRS sensors 124, RA sensors 128, and GPS sensors; in an embodiment, the sensor reliance includes a collection of selected aircraft sensors 106 instances; in an embodiment, the sensor reliance includes a voted solution computed from available and deemed valid aircraft sensors 106 instances.

At 308, the method 300 moves to grouping the aircraft sensors 106 into sensor subgroups by sensor type. At 310, and with reference to FIG. 4, the method 300 presents a graphical user interface (GUI) page 408 on the display system, the GUI page identifying (i.e., naming) a sensor subgroup (air data 404) of the multiple sensor subgroups, the aircraft sensors 106 instances (412) making up the sensor subgroup, and for each aircraft sensors 106 instance, a critical sensor parameter (410) and associated critical sensor parameter data. As may be appreciated, at 308, the method 300 and system 102 is capable of displaying every sensor subgroup of the multiple sensor subgroups this same way.

As may be appreciated, the tasks 312 and 314 are optionally performed, only responsive to the underlying determination. As an overview, each of the tasks 312 and 314 may be referred to as a miscompare. Generally, the method 300 visually distinguishes on an avionic display, a miscompare of critical sensor parameter data with a miscompare alert. Determining a miscompare relies on hardware or software implementations (e.g., via program 9) of logic to compare values to each other and to respective acceptable thresholds and critical thresholds that are preprogrammed. In one non-limiting example, responsive to determining that all aircraft sensors of a same type are miscomparing with each other, the system 102 flags all associated sensor data and aircraft sensors. An aircraft sensor that is a problem sensor can be one that has sensor data that exceed the acceptable threshold, or one that has sensor data that exceed the critical threshold (a failed sensor). As described herein, a variety of visually distinguishing techniques may be used. As a non-limiting example, critical sensor parameter 410 data may be outlined with a box (see, e.g., ADS2, and data 220, 265, −124 and −11.7).

As mentioned, the method 300 visually distinguishes on the GUI, for an avionic system, critical sensor parameter data determined to exceed an acceptable threshold (at 312) in comparison to a remainder of critical sensor parameter 410 data in the sensor subgroup. In an embodiment, this task may include highlighting the sensor data in a first color, such as amber, to indicate a caution condition. At 314, the method visually distinguishes on the GUI, critical sensor parameter data determined to be from a failed aircraft sensor (e.g., see FIG. 4 and FIG. 6). At 314, the failed determination may be determined when the critical sensor parameter data is determined to exceed a critical threshold, the critical threshold being larger than the acceptable threshold, or when no data from a particular aircraft sensor instance is received. In an embodiment, this task may include highlighting the critical sensor parameter data in a second color, such as red, to indicate a critical condition. Each of these caution condition and critical conditions may also be referred to herein as a miscompare.

At 316, the method 300 responds to a user selection on the GUI page of an aircraft sensor by preventing consumption of critical sensor parameter data from the aircraft sensor of the user selection. Visually, on the display system of the HMI, this looks like un-checking or un-selecting the respective sensor signal. As may be appreciated, this is likely to happen when either at 312 or at 314 an aircraft sensor 106 was determined to exceed the acceptable threshold or to have failed by exceeding the critical threshold.

Figure 6:
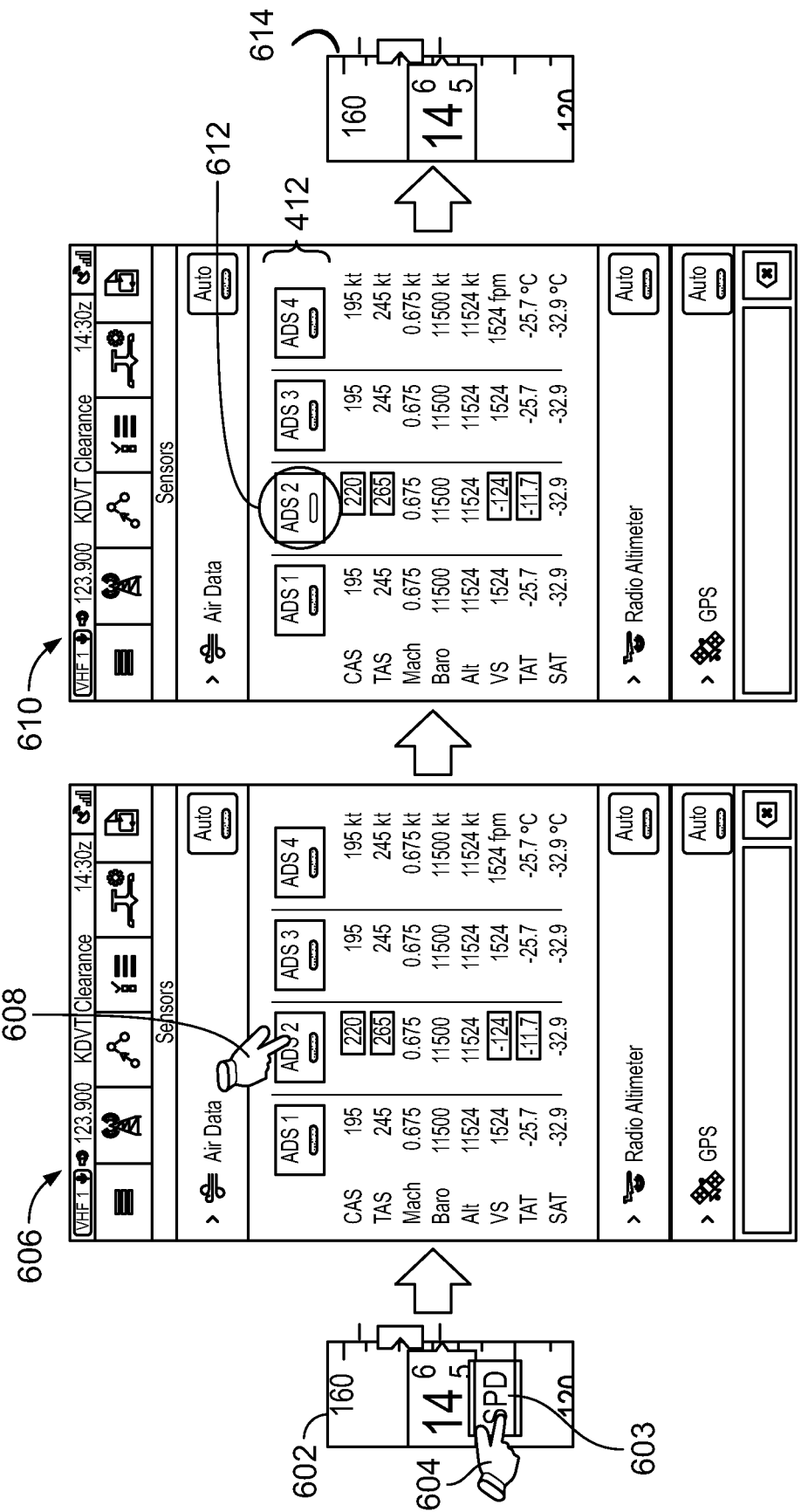
FIG. 6 is an illustration showing an operational example of resolving a sensor miscompare, in accordance with exemplary embodiments.

At 318, if a user selection occurred at 316, the method 300 revises the representative signals generated at 304 responsive to the user selection at 316 to thereby prevent consumption of undesirable miscompares and updates the GUI page by indicating the user selection (e.g., by showing the de-selected aircraft sensor, as shown in FIG. 6, 612).

At 320, the method 300 proceeds to transmitting the representative signals to the avionic systems in accordance with the respective sensor reliance. For example, at 320 the method 300 transmits the representative ADS signal, the representative IRS signal, and the representative RA signal to each avionic system of the plurality of avionic systems 108, only in accordance with the respective sensor reliance for the avionic system.

After 320, the method 300 may return to 302 or end.

In various embodiments, the system 102 may also generate an avionic display (such as a PFD) on a touch sensitive screen; render a miscompare flag on the avionic display, responsive to identifying a miscompare of sensor data from an aircraft sensor; and, automatically, and without further human input, open a second GUI page relevant to the aircraft sensor associated with the miscompare flag. Examples of GUI pages and avionic displays that the system 102 may present are provided below.

Figure 4:
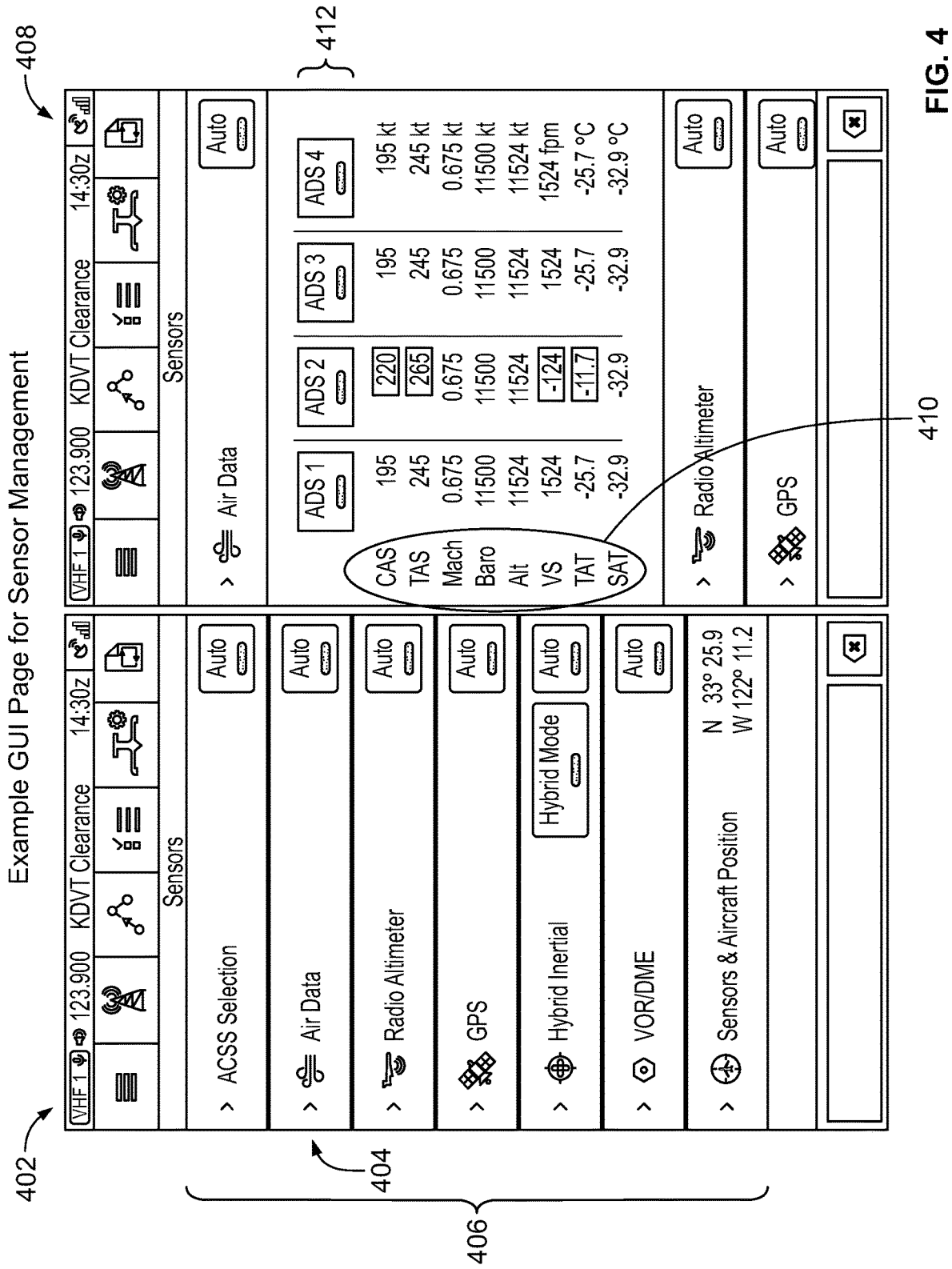
FIG. 4 is an illustration of a GUI page for aircraft sensor management, in accordance with exemplary embodiments.

FIG. 4 provides exemplary embodiments of GUI pages for sensor management, provided on an avionic display, as may be generated by the system 102 and method 300. The GUI page 408 shows an avionics menu page providing a readout of critical sensor data from all available aircraft sensors 106 (for an avionics subgroup) for easy side-by-side comparison of the sensor data. Illustrations on FIG. 4 also show visual distinction of the sensor parameters that are miscomparing with other sensor instances. In various embodiments, visually distinguishing techniques can include using an amber inverse video and placing a "!" sign on the FIG. 4 below.

The GUI user interface shown in FIG. 4 allows a pilot to easily, with a single action, disable any sensor from the use by all avionics systems otherwise configured to consume the sensor data from the problem sensor. The GUI page 402 and GUI page 408 are non-limiting examples intended to show the improved HMI experience and intuitive, concise information provided by embodiments.

The GUI page 402 shows a summary of the multiple sensor subgroups 406, of which air data 404 is one. The multiple subgroups are user selectable, and responsive to a user selection, a sensor subgroup will open to reveal subgroup-specific information. For example, responsive to selecting 404, GUI page 408 is displayed, bearing a title air "Air Data", and presenting information in a tabular format. In the exemplary embodiment, the critical sensor parameters 410 of the aircraft sensors in the sensor subgroup are presented in a column on the left, and the selectable column headers 412 from left to right include ADS1, ADS2, ADS3, and ADS4, representing individual aircraft sensor instances of on-board aircraft sensors 106 of the same type (e.g., ADS 126) installed on the aircraft. Viewing the critical sensor parameter data as it is displayed in this embodiment, viewing a row of critical sensor parameter data from left to right for individual selected critical parameters from given sensor type 410 are shown, it is desirable that the presented critical sensor parameter data from left to right in the row be within an acceptable threshold of each other. As can be seen in this embodiment, the ADS2 sensor entries are visually distinguished with a highlighted background or enclosed in a box to indicate that one or more critical parameters from this ADS2 sensor has exceeded its acceptable threshold. Viewing the other entries in this table, it is apparent that the aircraft sensor ADS2 is providing sensor data that exceeds an acceptable threshold in four instances (critical parameters CAS, TAS, VS and TAT).

Various embodiments default to displaying each of the column headers 412 in a selected state. Provided embodiments advantageously allow a user to deselect a column header with user input, such as, but not limited to, a touch.

Figure 5:
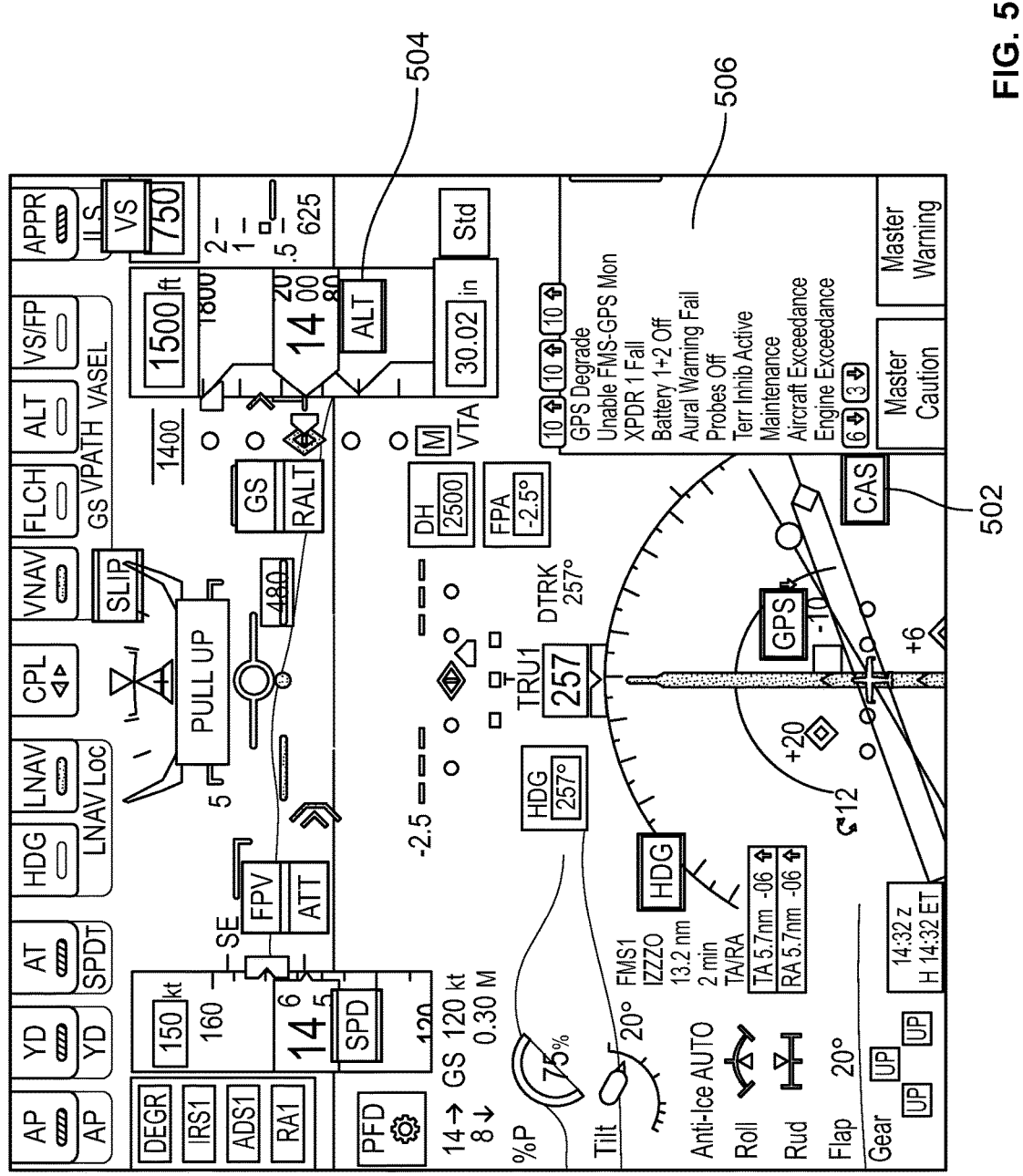
FIG. 5 is an illustration of a primary flight display (PFD) with touchable sensor flags, in accordance with exemplary embodiments.

FIG. 5 illustrates a primary flight display (PFD) 500 avionic display as may be seen in a cockpit. The PFD 500 may be a touch sensitive screen on which the system 102 has rendered/annunciated one or more touchable sensor alerts. In other embodiments, the PFD 500 is not a touch screen, and user input is received via a cursor control device. The PFD 500 further enhances and simplifies cockpit operation for the crew with a hyperlinking feature that provides hyperlinking announcement with touchable sensor flags for an avionic system dependent upon an aircraft sensor 106 that has been determined to be a critical or caution condition (typically by utilizing visualization techniques in the primary field of the view). Example of different touchable sensor alerts are depicted on FIG. 5, in the black outline rectangles around critical parameters, see, e.g., CAS 502 the crew alerting system, and ALT 504 altitude. This FIG. 5 illustrates two independent systems providing different messages, which indicates that at least one of them must be wrong. In embodiments using color, the visualization technique may include highlighting around the text of the avionic system acronym. The announcements provide pilot with information that a given flight critical parameter may involve miscompares among used sensors. This is an abnormal scenario and requires pilot attention and resolution of the situation. Embodiments provided herein enable a user to select a touchable sensor flag from the one or more touchable sensor flags on PFD 500. Responsive to detecting the user selection, render/open a corresponding avionics sensor management menu page and panel (e.g., FIG. 4 GUI page 408) by the system 102 or method 300.

FIG. 6 provides a use example of the concepts of FIGS. 4-5. On the left of the page, a speed tape 602, as may be found on the GUI page 500, has SPD annunciated 603 (in this example, it has a box around it). The user touches 604 the SPD announcement 603, and responsive to detecting the touch 604, the system 102 presents the GUI page 606. The analysis of GUI page 606 follows the discussion of the analysis of FIG. 4. The pilot selects ADS2 with a touch 608, to deselect it (at 316), or prevent the sensor data from ADS2 from being consumed by avionic systems 108. Responsive to detecting the touch 608, the ADS2 is deselected 612 as shown on GUI page 610, in the exemplary embodiment this is indicated with a removal of an underscore, which can be seen when viewing 412, as the narrow oval underneath ADS2 is clear (612), as compared to the narrow ovals under ADS1, ADS3, and ADS4. The SPD 603 is now removed from the speed tape 614. Also, responsive to the deselection 612, as mentioned above, the system 102 and method 300 revise the representative sensor signals 122 generated at 304 and transmits the representative signals to the avionic systems in accordance with the respective sensor reliance.

Accordingly, the present disclosure has provided several embodiments of systems and methods for enabling user control over use of aircraft sensors located onboard an aircraft. Proposed embodiments advantageously simplify pilot self-assessments and are not reliant upon historical data.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system enabling user control over use of aircraft sensors located onboard an aircraft, comprising:
    a plurality of avionic systems onboard the aircraft;
    a display system; and
    a controller circuit operationally positioned between the aircraft sensors and the plurality of avionic systems, and programmed to:
        wherein the aircraft sensors comprise a first number of air data system (ADS) sensors, a second number of inertial reference system (IRS) sensors, and a third number of radio altimeter sensors (RA), and wherein each ADS sensor generates a respective ADS signal, each IRS sensor generates a respective IRS signal, and each RA sensor generates a respective RA signal,
        receive the ADS signals, the IRS signals, and the RA signals, collectively referred to as sensor signals;
        determine, for each avionic system of the plurality of avionic systems, a respective sensor reliance, defined as a unique combination of aircraft sensors that the avionic system consumes sensor signals from;
        group the aircraft sensors into sensor subgroups by sensor type;
        present a graphical user interface (GUI) page on the display system, the GUI page identifying a sensor subgroup, the aircraft sensors of the respective sensor subgroup, and a critical sensor parameter and associated critical sensor parameter data from each aircraft sensor in the sensor subgroup;
        visually distinguish on the GUI page, critical sensor parameter data that exceeds an acceptable threshold in comparison to a remainder of critical sensor parameter data;
        visually distinguish on the GUI page, critical sensor parameter data that exceeds a critical threshold in comparison to a remainder of critical sensor parameter data,
        wherein the critical threshold is larger than the acceptable threshold or corresponds to a failed aircraft sensor,
        wherein the critical sensor parameter data that exceeds the critical threshold is visually distinguished in a different way than the way the critical sensor parameter data that exceeds the acceptable threshold is visually distinguished;
        generate a representative ADS signal based on the ADS signals;
        generate a representative IRS signal based on the IRS signals;
        generate a representative RA signal based on the RA signals; and
        transmit the representative ADS signal, the representative IRS signal and the representative RA signal to each avionic system of the plurality of avionic systems, only in accordance with the sensor reliance for the respective avionic system,
        wherein, in response to a user selection on the GUI page, the controller circuit is arranged to avoid consumption of sensor signal data from the aircraft sensor of the user selection.

2. The system of claim 1, wherein the display system is configured to:
    generate an avionic display on a touch sensitive screen; and
    the controller circuit is further configured to:
        render a miscompare flag on the avionic display, responsive to identifying a miscompare of sensor data from an avionic sensor; and
        automatically, and without further human input, open a second GUI page relevant to the avionic sensor associated with the miscompare flag.

3. The system of claim 1, further comprising:
    an input device coupled to the controller circuit, configured to receive a user-defined sensor reliance; and
    the controller circuit determines the sensor reliance further as a function of the user-defined sensor reliance.

4. The system of claim 1, wherein the controller circuit visually distinguishes critical sensor parameter data by using a highlight color background at a parameter value.

5. The system of claim 1, wherein the controller circuit visually distinguishes the critical sensor parameter data using a highlight color background that is different for the critical sensor parameter data that exceeds the critical threshold versus the critical sensor parameter data that exceeds the acceptable threshold.

6. The system of claim 1, wherein the controller circuit is further programmed to respond to a user selection on the GUI page of an aircraft sensor by preventing consumption of sensor signal data from the user selected aircraft sensor.

7. The system of claim 1, wherein the controller circuit is further programmed to:
    present a primary flight display (PFD) on the display system; and
    render one or more touchable sensor flags on the PFD.

8. The system of claim 7, wherein the controller circuit is further programmed to:
    detect a touch of a touchable sensor flag of the one or more touchable sensor flags on the PFD; and
    open a corresponding avionics sensor management menu page, responsive to detecting the touch.

9. A method enabling user control over use of aircraft sensors located onboard an aircraft, comprising:
    at a controller circuit operationally positioned between aircraft sensors and a plurality of avionic systems, the aircraft sensors comprising a first number of air data system (ADS) sensors, a second number of inertial reference system (IRS) sensors, and a third number of radio altimeter sensors (RA);

receiving a first number of ADS signals, a second number of IRS signals and a third number of RA signals, the ADS signals, the IRS signals, and the RA signals, collectively referred to as sensor signals;

generating a representative ADS signal based on the ADS signals;

generating a representative IRS signal based on the IRS signals;

generating a representative RA signal based on the RA signals;

determining, for each avionic system of a plurality of avionic systems on-board the aircraft, a respective sensor reliance, defined as a unique combination of aircraft sensors that the avionic system consumes sensor signals from;

grouping the aircraft sensors into sensor subgroups by sensor type;

presenting a graphical user interface (GUI) page on a display system, the GUI page identifying a sensor subgroup, the aircraft sensors of the respective sensor subgroup, and a critical sensor parameter and associated critical sensor parameter data from each aircraft sensor in the sensor subgroup;

visually distinguishing on the GUI page, critical sensor parameter data that exceeds an acceptable threshold in comparison to a remainder of critical sensor parameter data;

visually distinguishing on the GUI, critical sensor parameter data that exceeds a critical threshold, wherein the critical threshold is larger than the acceptable threshold or corresponds to a failed aircraft sensor, wherein the critical sensor parameter data that exceeds the critical threshold is visually distinguished in a different way than the way the critical sensor parameter data that exceeds the acceptable threshold is visually distinguished;

responding to a user selection on the GUI page of an aircraft sensor by preventing consumption of the critical sensor parameter data from the aircraft sensor of the user selection; and transmitting the representative ADS signal, the representative IRS signal and the representative RA signal to each avionic system of the plurality of avionic systems, only in accordance with the sensor reliance for the respective avionic system.

10. The method of claim 9, further comprising:
generating an avionic display on a touch sensitive screen;
rendering a miscompare flag on the avionic display, responsive to identifying a miscompare of critical sensor parameter data from an avionic sensor; and
automatically, and without further human input, opening a GUI page relevant to the avionic sensor associated with the miscompare flag.

11. The method of claim 9, further comprising:
receiving a user-defined sensor reliance; and
determining the sensor reliance further as a function of the user-defined sensor reliance.

12. The method of claim 9, further comprising responding to a user selection of an aircraft sensor on the GUI page by preventing consumption of critical sensor parameter data from the aircraft sensor of the user selection.

13. The method of claim 9, further comprising:
presenting a primary flight display (PFD) on the display system; and
rendering one or more touchable sensor flags on the PFD.

14. The method of claim 13, further comprising:
detecting a touch of a touchable sensor flag of the one or more touchable sensor flags on the PFD; and
opening a corresponding avionics sensor management menu page, responsive to detecting the touch.

15. A method enabling user control over use of aircraft sensors located onboard an aircraft, the aircraft sensors comprising a first number of air data system (ADS) sensors, a second number of inertial reference system (IRS) sensors, and a third number of radio altimeter sensors (RA), the method comprising:

at a controller circuit operationally positioned between aircraft sensors and a plurality of avionic systems, receiving sensor signals comprising a first number of ADS signals, a second number of IRS signals and a third number of RA signals, the ADS signals, the IRS signals, and the RA signals;

comparing avionic sensor data values in the sensor signals to each other and to respective acceptable thresholds and critical thresholds that are preprogrammed;

determining, for each avionic system of a plurality of avionic systems on-board the aircraft, a respective sensor reliance, defined as a unique combination of aircraft sensors that the avionic system consumes sensor signals from;

grouping the aircraft sensors into sensor subgroups by sensor type;

presenting a graphical user interface (GUI) page on a display system onboard the aircraft, the GUI page identifying a sensor subgroup, the aircraft sensors of the respective sensor subgroup, and a critical sensor parameter and associated critical sensor parameter data from each aircraft sensor in the sensor subgroup;

visually distinguishing on the GUI page, a critical sensor parameter data that exceeds a respective acceptable threshold or exceeds the respective critical threshold;

wherein the critical sensor parameter data that exceeds the critical threshold is visually distinguished in a way that is different than a way the critical sensor parameter data that exceeds the acceptable threshold is visually distinguished;

responding to a user selection of an aircraft sensor by preventing consumption of critical sensor parameter data from the aircraft sensor of the user selection; and transmitting a representative ADS signal, a representative IRS signal and a representative RA signal to each avionic system of the plurality of avionic systems, only in accordance with the sensor reliance for the respective avionic system.

16. The method of claim 15, further comprising:
generating an avionic display on a touch sensitive screen;
rendering a miscompare flag on the avionic display, for the critical sensor parameter data that exceeds the respective acceptable threshold or exceeds the respective critical threshold; and
automatically, and without further human input, opening a GUI page relevant to the avionic sensor associated with the miscompare flag.

17. The method of claim 16, further comprising:
receiving a user-defined sensor reliance; and
determining the sensor reliance further as a function of the user-defined sensor reliance.

* * * * *